United States Patent [19]

Miles

[11] 4,396,319
[45] Aug. 2, 1983

[54] ADJUSTABLE INSERT CARTRIDGE

[75] Inventor: Wilbur N. Miles, Chagrin Falls, Ohio

[73] Assignee: Erickson Tool Company, Solon, Ohio

[21] Appl. No.: 218,474

[22] Filed: Dec. 22, 1980

[51] Int. Cl.³ .......................................... B23B 29/02
[52] U.S. Cl. .................... 408/155; 408/153; 408/154
[58] Field of Search .............. 408/153, 154, 155, 156, 408/181, 186, 146

[56] References Cited

U.S. PATENT DOCUMENTS

| 2,849,902 | 9/1958 | Devleig et al. | 408/181 |
|---|---|---|---|
| 3,262,184 | 7/1966 | Sweeney | 408/153 X |
| 3,349,648 | 10/1967 | Holloway | 408/154 |
| 3,434,376 | 3/1969 | Benjamin et al. | 408/153 |
| 3,690,783 | 9/1972 | Heaton | 408/186 X |
| 3,697,187 | 10/1972 | Faber | 408/154 |
| 3,877,832 | 4/1975 | Benjamin | 408/155 |
| 3,911,542 | 10/1975 | Freidline | 408/154 X |

FOREIGN PATENT DOCUMENTS

| 2138552 | 2/1973 | Fed. Rep. of Germany | 408/155 |
|---|---|---|---|
| 559442 | 2/1944 | United Kingdom | 408/153 |
| 1288713 | 9/1972 | United Kingdom | 408/153 |
| 1405426 | 9/1975 | United Kingdom | 408/154 |
| 1409249 | 10/1975 | United Kingdom | 408/181 |

Primary Examiner—William R. Briggs
Attorney, Agent, or Firm—Lawrence R. Burns; Ira D. Blecker

[57] ABSTRACT

An adjustable insert cartridge is described in which a toolholder shank is threadedly engaged in a threaded adjusting sleeve having a flange with a rearwardly facing face. The rearwardly facing face is in rotatable sliding engagement with a forwardly facing face on a mounting collar which is attached to a boring bar. The rearwardly and forwardly facing faces are held in abutment by a spring which is compressed between a rear face of the mounting collar and an adjusting ring threadedly engaged on the adjusting sleeve.

15 Claims, 3 Drawing Figures

ADJUSTABLE INSERT CARTRIDGE

BACKGROUND OF THE INVENTION

The present invention relates to an adjustable cutting insert cartridge for use in a boring bar. More particularly, the present invention relates to improvements in adjustable cartridge designs which increase the ease with which these cartridges can be manufactured and used.

Adjustable insert cartridges are designed to achieve the accurate and rapid adjustment of a cutting insert on a boring bar. These cartridges typically consist of a toolholder having a cutting insert on one end and a threaded shank on the other. The threaded shank is threadedly engaged in an adjusting nut or sleeve which is rotatably mounted in a collar which is bolted onto the boring bar. The threaded shank, sleeve and collar are fitted together in a manner that attempts to minimize play between them. This is usually accomplished through the use of a spring-like member that forces the components together. Examples of adjustable cartridge designs can be found in U.S. Pat. Nos. 3,313,187 and 3,434,376, both assigned to applicant corporation. While these designs have proven to be satisfactory in use, most of these designs do not allow for adjustment in the tension or load imparted to the various components in the cartridge by the spring. This means that the tolerances on the various components must be relatively tight to assure that the correct amount of loading is applied to the components.

This problem may be compounded by wear that occurs between the components during use. In one design which did allow for the adjustment of the load applied to the components (see U.S. Pat. No. 3,434,376, FIG. 5), the load adjusting components, while being held nonrotational with respect to the adjusting nut or sleeve, were mounted directly on the threaded shank of the toolholder.

In this design, in order to adjust the load by the relative rotation of one of the load adjusting members relative to the adjusting nut or sleeve, first the load adjusting members had to be partially disassembled, the member rotated to the desired position, and then reassembled. This is both inconvenient and time consuming.

BRIEF SUMMARY OF THE INVENTION

According to the present invention, a boring bar adjustable insert cartridge is provided in which play between the components of the cartridge can be eliminated through the use of an easily adjustable loading device. In general, the present invention comprises an adjusting sleeve, or nut, having an adjusting ring threadedly engaged on it.

A spring washer is placed between the sleeve and ring, urging the sleeve and ring axially apart and keeping the ring nonrotational with respect to the sleeve during boring operations. Advancing or retracting the ring by rotation of the ring relative to the sleeve, respectively, increases or decreases the loading on the members.

Preferably, located between a flange on the adjusting sleeve and the spring washer is a mounting collar which is forced into abutment with the flange by the spring washer so that the adjusting sleeve is properly seated within the mounting collar and is in sliding rotatable engagement with it. A threaded toolholder shank is threadedly engaged in the adjusting sleeve.

Preferably, the adjustable sleeve is elastically expansible such that, when it is placed under load by the spring washer it axial expands, thereby removing play between the threads on the shank and the adjusting sleeve.

Adjustments in the loading applied by the spring to compensate for component wear, or change of components can thereby be easily made by simply rotating the ring with respect to the adjusting sleeve. Once the loading adjustment has been made, rotation of the adjusting sleeve will accurately move the threaded toolholder shank inward or outward, depending on the direction of rotation.

Therefore, it is an object of the present invention to provide an adjustable insert cartridge of novel design and capable of accurate tool adjustment.

It is also an object of the present invention to provide an adjustable insert cartridge in which play between its components has been eliminated and in which the loading under which the components abut one another is easily adjustable.

A further object of the present invention is to provide a novel method of assembling an adjustable insert cartridge and adjusting the loading applied to remove play between the component parts.

BRIEF DESCRIPTION OF THE DRAWINGS

The exact nature of the present invention will become more clearly apparent upon reference to the following detailed specification taken in connection with the accompanying drawings in which.

DETAILED DESCRIPTION OF THE INVENTION

Figure 1:
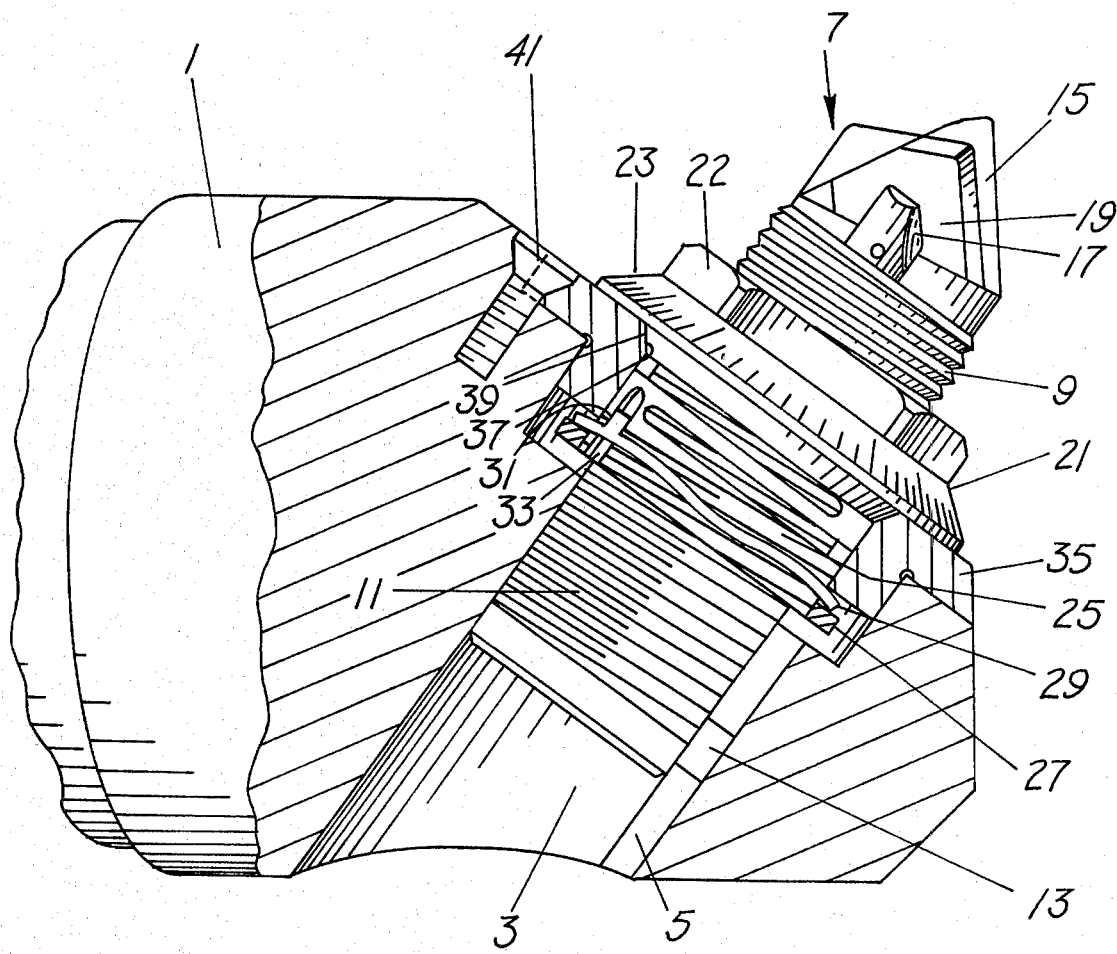
FIG. 1 is a partially sectionalized view of an adjustable insert cartridge mounted in a boring bar according to the present invention.

Referring to the drawings somewhat more in detail, it can be seen by observing FIG. 1 that the present invention comprises a boring bar 1 having an adjustable insert cartridge 7 mounted in a perforation 3 within the boring bar 1. The perforation 3 has a keyway 5 which registers with a key member 13 on the shank 11 of the toolholder 9 to hold the toolholder nonrotatable when it is mounted on the boring bar 1.

The adjustable insert cartridge 7 comprises a toolholder 9 having a rear end or a threaded shank end 11 at one end, at the opposite end or the forward end, is an insert seat for mounting a cutting insert 15. The cutting insert 15 is preferably an indexable cutting insert. As shown in the drawings, the cutting insert 15 is held on the insert seat by a clamp 17. In the embodiment shown, a replaceable chipbreaker 19 has been placed between the clamp 17 and the cutting insert 15.

The threaded shank 11 of the toolholder 9 is threadedly engaged in an internally threaded adjusting sleeve 21. The adjusting sleeve 21 has a flange 23 near its forward end. On the forward face of the flange 23 is a scale and a hex type configuration 22 for turning the adjusting sleeve 21. The rearward portion of the flange 23 consists of a frusto-conical portion having a rearwardly facing face 39 which is abutted against a forwardly facing face 37 on a mounting collar 35. The rearward portion of the adjusting sleeve 21 has external threads 25. Mounted on these external threads 25 is an adjusting ring 27 and between the adjusting ring 27 and the mounting collar 35 is a spring washer 29 which is abutted against the mounting collar 35 and the adjusting ring 27. The spring washer 29 is held nonrotatable with respect to the adjusting sleeve 21 by a tab 31 on the washer 29 which registers in a groove 33 on the sleeve 21. This whole assembly is attached to the boring bar 1 by mounting screws 41 which threadedly engage in the boring bar and register in notches in the mounting collar 35.

Figure 2:
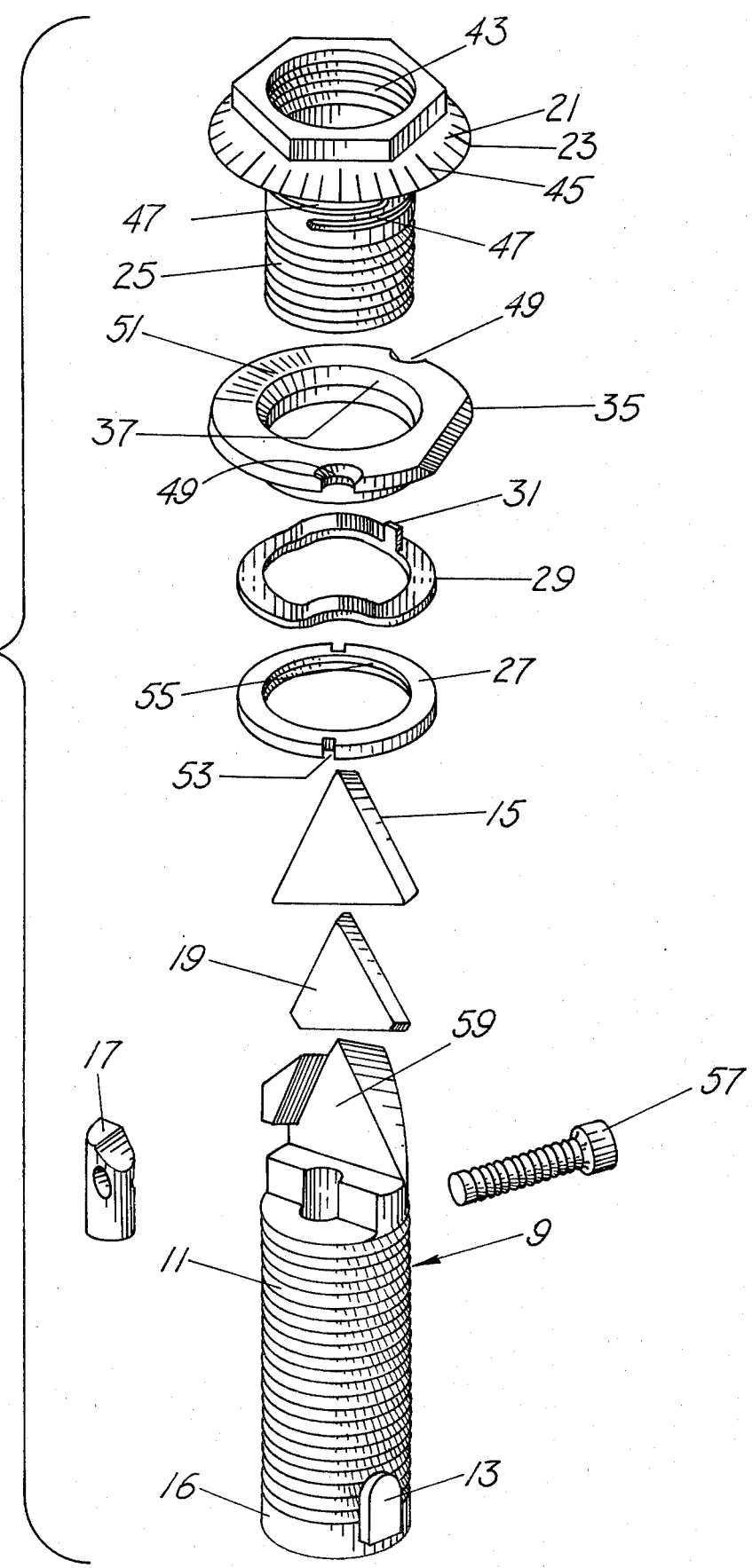
FIG. 2 is an exploded view of the adjustable insert cartridge according to the present invention.

Referring now to FIG. 2, which is an exploded view of the adjustable insert cartridge 7, it can be seen that the adjusting sleeve 21 has internal threads 43 and a flange 23 extending outwardly from it. On the forward face of the flange is a calibrated scale 45 which, when registered with calibrated scale 51 on the forward face of the mounting collar 35, forms a Vernier-type scale. Aft of the flange 23 on the adjusting sleeve 21 are circumferential slots 47 which are followed by external threads 25. Observing the mounting collar 35, it can be seen that it has two notches 49 in its periphery for registering with the mounting screws for attachment to the boring bar 1. It can also be seen that the mounting collar has a forwardly facing face 37 which is a frusto-conical surface that mates with a frusto-conical surface on the adjusting sleeve.

The adjusting sleeve 21 is slid into the bore of the mounting collar 35 and, thereupon, has a spring washer 29 placed over the external threads 25 of the adjusting sleeve 21. The spring washer 29 has a tab 31 which registers in an axial groove 33 formed in the external surface of the adjusting sleeve 21. The spring washer 29 is thereby held nonrotatable with respect to the adjusting sleeve 21 and thereby avoids binding of the washer in the external threads 25.

An adjusting ring 27 is then threadedly engaged onto the external threads of the adjusting sleeve 21. It can be seen in FIG. 2 that the adjusting ring 27 has internal threads 55 and notches 53 on its external periphery for rotating the adjusting ring 27. The adjusting ring 27 is threadedly engaged onto adjusting sleeve 27 so as to compress the spring washer 29 which thereby urges the adjusting sleeve 21 into pressurized abutment with the mounting collar 35.

The toolholder 9 having a threaded shank 11 is threadedly engaged in the internal threads 43 of the adjusting sleeve 21. An indexable cutting insert 15 is mounted in the insert receiving pocket 59 at the forward end of the toolholder 9. A chipbreaker 19 is placed on the top surface of the indexable cutting insert 15 and these two components are clamped onto the insert receiving pocket by a clamp 17 which is forced into abutment with the top surface of the chipbreaker 19 by a clamp screw 57.

Looking more closely at the rearmost end of the threaded shank 11, it can be seen that there is a key member 13 located there and, in addition, the rearmost portion of the threaded shank has a smooth periphery 16 for sliding engagement in the perforation 3 of the boring bar 1.

Figure 3:
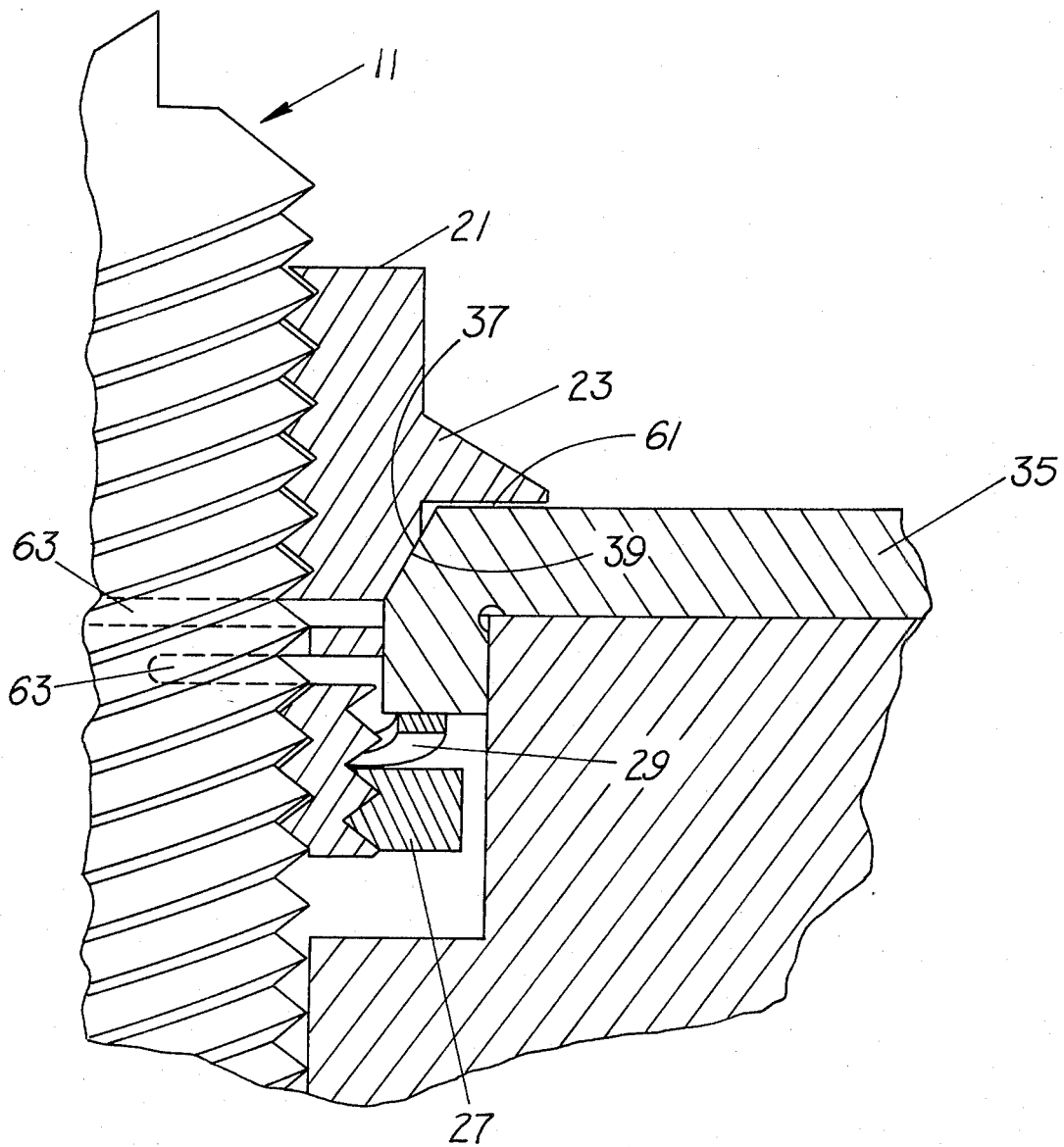
FIG. 3 is another sectionalized view of the adjustable insert cartridge according to the present invention.

Referring to FIG. 3, it can be seen more clearly how the present invention operates to remove any play between the components. It can be seen that the adjusting ring 27 is threadedly engaged on the external threads of the adjusting sleeve 21. In between the flange 23 of the adjusting sleeve 21 and the adjusting ring 27 are located a spring washer 29 and the mounting collar 35.

The spring washer 29 is compressed against the mounting collar, driving the rearwardly facing face 39 of the flange 23 into firm abutment with the forwardly facing face 37 of the mounting collar 35. It can be seen that only these frusto-conical surfaces are in abutment and there is a space 61 maintained between the horizontal surfaces of the mounting collar and the flange. In this manner, the adjusting sleeve 21 is centered in the mounting collar bore.

While the compression of the spring washer 29 forces the adjusting sleeve 21 into firm abutment with the mounting collar 35, it also axially expands the adjusting sleeve 21. The adjusting sleeve has slots 63 located between the adjusting ring 27 and the flange 23. When the adjusting sleeve 21 is driven into pressurized abutment with the mounting collar 35, this causes the width of slot 63 to expand and thereby and play that was present between the internal threads 43 of the adjusting sleeve 21 and the threaded shank 11 of the toolholder 9 is eliminated.

In accordance with the present invention, accurate adjustments in the axial position of the toolholder 9 can be easily made by rotating the adjusting sleeve 21. While making these adjustments in position, both the spring washer 29 and adjusting ring 27 rotate with the adjusting sleeve thereby maintaining the originally loading on the cartridge components. Adjustments in the applied loading are achieved simply by rotating the adjusting ring 27 while holding the adjusting sleeve 21 fixed.

Modifications may be made within the scope of the appended claims.

What is claimed is:

1. An adjustable insert cartridge having an insert seat for receiving a cutting insert at its forward end, wherein said adjustable insert cartridge comprises: a toolholder shank; an adjusting sleeve having a forward end, a rear end, a flange having a rearwardly facing face, and a first bore communicating between said forward end and said rear end; said toolholder shank in threaded engagement with said first bore; a mounting collar having a forwardly facing surface, and a rearwardly facing surface; means for applying pressure between said adjusting sleeve and said mounting collar mounted on said adjusting sleeve wherein said means for applying pressure comprises a first spring means and an adjusting ring, said spring means mounted on said adjusting sleeve and held in pressurized abutment between said rearwardly facing surface of said mounting collar and said adjusting ring, said adjusting ring is threadedly engaged to said adjusting sleeve and held nonrotational with respect to said sleeve by said first spring means when said sleeve is rotated; said mounting collar held on said adjusting sleeve between said flange rearwardly facing face and said means for applying pressure; and said adjusting sleeve in rotatable engagement with said mounting collar.

2. The insert cartridge of claim 1 further comprising means for holding said first spring means nonrotational with respect to said sleeve when said sleeve is rotated.

3. The insert cartridge of claim 2 wherein said first spring means is a spring washer having a generally circular shape and a tab transverse to its radius; wherein said adjusting sleeve has a longitudinal groove; and wherein said means for holding said first spring means nonrotational with respect to said sleeve when said sleeve is rotated comprises said tab slidingly engaging said groove.

4. An adjustable insert cartridge according to claim 1 wherein said adjusting sleeve comprises a second spring means for expanding said sleeve in a direction parallel to said forward direction.

5. A boring bar comprising: an elongate body having a socket at one end; an adjustable insert cartridge mounted in said socket; said adjustable insert cartridge having: a toolholder shank; an adjusting sleeve having a forward end, a rear end, a flange having a rearwardly facing face and a first bore communicating between said forward end and said rear end; said toolholder shank in threaded engagement with said first bore; a mounting collar having a forwardly facing surface and a rearwardly facing surface; means for applying pressure, between said adjusting sleeve and said mounting collar, mounted on said adjusting sleeve wherein said means for applying pressure comprises a first spring means and an adjusting ring, said spring means mounted on said adjusting sleeve and held in pressurized abutment between said rearwardly facing surface of said mounting collar and said adjusting ring, said adjusting ring is threadedly engaged to said adjusting sleeve and held nonrotational with respect to said sleeve by said first spring means when said sleeve is rotated; said mounting collar held on said sleeve between said flange rearwardly facing face and said means for applying pressure and said adjusting sleeve is in rotatable engagement with said mounting collar; means for holding said toolholder shank nonrotatable, but slidable, along the length of said socket.

6. The boring bar of claim 5 further comprising means for holding said first spring means nonrotational with respect to said sleeve when said sleeve is rotated.

7. The boring bar of claim 6 wherein said first spring means is a spring washer having a generally circular shape and a tab transverse to its radius; wherein said adjusting sleeve has a longitudinal groove; and wherein said means for holding said first spring means nonrotational with respect to said sleeve when said sleeve is rotated comprises said tab slidingly engaging said groove.

8. A boring bar according to claim 5 wherein said adjusting sleeve comprises a second spring means for expanding said sleeve in a direction parallel to said forward direction.

9. The invention according to claim 8 further comprising an indexable cutting insert clamped into said adjustable insert cartridge.

10. The invention according to claim 4 further comprising an indexable cutting insert clamped into said insert seat.

11. A device for use in translating rotary motion to linear adjustments in a toolholder having a forward end with a cutting insert seat and a rear end with a threaded shank on which said device is mounted, said device comprising: an adjusting sleeve having a forward end, a rear end, a flange having a rearwardly facing face and a threaded bore for engagement with said threaded shank communicating between said forward end and said rear end; a mounting collar having a forwardly facing surface and a rearwardly facing surface; means for applying pressure between said adjusting sleeve and said mounting collar mounted on said adjusting sleeve wherein said means for applying pressure comprises a first spring means and an adjusting ring, said spring means mounted on said adjusting sleeve and held in pressurized abutment between said rearwardly facing surface of said mounting collar and said adjusting ring, said adjusting ring is threadedly engaged to said adjusting sleeve and held nonrotational with respect to said sleeve by said first spring means when said sleeve is rotated; said mounting collar held on said adjusting sleeve between said flange rearwardly facing face and said means for applying pressure; and said adjusting sleeve in rotatable engagement with said mounting collar.

12. A device according to claim 11 wherein said adjusting sleeve comprises a second spring means allowing expansion of said sleeve in a direction parallel to said forward direction.

13. The device of claim 11 further comprising means for holding said first spring means nonrotational with respect to said sleeve when said sleeve is rotated.

14. The device of claim 13 wherein said first spring means is a spring washer having a generally circular shape and a tab transverse to its radius; wherein said adjusting sleeve has a longitudinal groove; and wherein said means for holding said first spring means nonrotational with respect to said sleeve when said sleeve is rotated comprises said tab slidingly engaging said groove.

15. A method of tool assembly comprising the steps of: obtaining an adjusting sleeve having a forward end, a rear end, a flange having a rearwardly facing face and a threaded bore communicating between said forward end and rear end; obtaining a mounting collar having a forwardly facing surface and a rearwardly facing surface; placing said mounting collar around said adjusting sleeve between said rearwardly facing face of said flange and said rear end of said adjusting sleeve; mounting on said adjusting sleeve a first spring means; threadedly engaging an adjusting ring with said adjusting sleeve; obtaining a toolholder having a forward end having an insert receiving pocket and a rear end having a threaded shank thereon; threadedly engaging said shank in said threaded bore; rotating said adjusting ring so that said first spring means is compressed thereby driving said rearwardly facing face of said flange into pressurized abutment with said forwardly facing face of said mounting collar and thereby axially expanding said adjusting sleeve so that play is removed between said adjusting sleeve and said threaded shank.

* * * * *